US011821302B2

(12) United States Patent
Haldar et al.

(10) Patent No.: US 11,821,302 B2
(45) Date of Patent: Nov. 21, 2023

(54) AUTOMATED DOWNHOLE LEAK DETECTION AND PREDICTION IN WATER INJECTION WELLS

(71) Applicant: Saudi Arabian Oil Company, Dhahran (SA)

(72) Inventors: Surajit Haldar, Navi Mumbai (IN); Ibrahim Mohamed El-Zefzafy, Udhailiyah (SA); Ayman A. Khalaf, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 180 days.

(21) Appl. No.: 16/793,776

(22) Filed: Feb. 18, 2020

(65) Prior Publication Data

US 2021/0254451 A1  Aug. 19, 2021

(51) Int. Cl.
*E21B 47/117* (2012.01)
*E21B 47/06* (2012.01)
*G01V 9/02* (2006.01)
*E21B 43/20* (2006.01)

(52) U.S. Cl.
CPC ............ *E21B 47/117* (2020.05); *E21B 47/06* (2013.01); *G01V 9/02* (2013.01); *E21B 43/20* (2013.01)

(58) Field of Classification Search
CPC ......... E21B 47/117; E21B 47/06; G01V 9/02; G06N 20/00
See application file for complete search history.

(56) References Cited

U.S. PATENT DOCUMENTS

2014/0244552 A1* 8/2014 Liu ................... G06N 20/00
  706/12
2020/0150634 A1 5/2020 Gray et al.
2021/0231003 A1 7/2021 Alkhalaf

FOREIGN PATENT DOCUMENTS

EP            3073051          9/2016
WO    WO-2010131113 A2 * 11/2010 ......... E21B 41/0064
WO       WO2016022069         2/2016
WO       WO 2018033524        2/2018

(Continued)

OTHER PUBLICATIONS

Tursinbayeva "Improving TCO Well Integrity Process through Successful Deployment of Well Integrity Portal". (Year: 2017).*

(Continued)

*Primary Examiner* — Michael J Dalbo
*Assistant Examiner* — Kaleria Knox
(74) *Attorney, Agent, or Firm* — Fish & Richardson P.C.

(57) ABSTRACT

Systems and methods include a method for downhole leak detection and prediction in water injection wells. Bulk well operation information for one or more wells is accessed from a database. Real-time pressure and water rate information is received from surface and downhole gauges during operation of a water injection well. Engineered prediction-ready data is generated using the real-time pressure and water rate information by translating the bulk well operation information. Early signs of leakage at sub-surfaces of the water injection well are determined using the engineered prediction-ready data and wellbore dynamics of the water injection well. Information associated the early signs of leakage is provided based on the determining and for presentation to one or more users.

17 Claims, 6 Drawing Sheets

(56) References Cited

FOREIGN PATENT DOCUMENTS

WO    WO 2021073763    4/2021

OTHER PUBLICATIONS

Al-Hajri "Calculating Casing Leak Cross Flow Rate Using Surface Injection Data". (Year: 2017).*

AlAjmi et al., "Profiling Downhole Casing Integrity Using Artificial Intelligence," SPE-173422-MS, Society of Petroleum Engineers, SPE Digital Energy Conference and Exhibition in the Woodlands, Texas, Mar. 3-5, 2015, 13 pages.

Al-Ajmi et al., "Risk based statistical approach to predict casing leaks," SPE 183948, Presented at SPE Middle East Oil & Gas Show and Conference, Manama, Kingdom of Bahrain, Mar. 6-9, 2017; Society of Petroleum Engineers, 2017, 19 pages.

Al-Mulhim et al., "Integrated Production Logging, Approach for Successful Leak Detection Between Two Formations: A Case Study," SPE 174835, Presented at the SPE Annual Technical Conference and Exhibition, Houston, TX, Sep. 28-30, 2015; Society of Petroleum Engineers, 2015, 15 pages.

Batista et al., "A complexity-invariant distance measure for time series," Data Mining and Knowledge Discovery, Apr. 2013, 28(3): 634-669.

Batista et al., "m(6)A RNA Modification Controls Cell Fate Transition in Mammalian Embryonic Stem Cells," Cell Stem Cell vol. 15, No. 1-13, Dec. 4, 2014, 14 pages.

Box et al., Time series analysis: forecasting and control, 3rd ed., Prentice-Hall International, Inc., 1994, 598 pages.

Das et al., "Preventing leaks through RUL prediction modeling: case integrity in HP/HT environment," SPE 184417, Presented at the SPE Health, Safety, Security, Environment, & Social Responsibility Conference, New Orleans, LA, Apr. 18-20, 2017; SPE Health Safety Security, Environment, & Social Responsibility Conference—North America, 2017, 9 pages.

Fulcher et al., "Highly comparative feture-based time-series classification," IEEE Transactions in Knowledge and Data Engineering, May 2014, 26:3026-3037.

Hwang and Elsinger, "Detecting Production Tubing Leak by Time Resolved Geochemical Analysis of Oils," SPE 29478, Society of Petroleum Engineers, presented at the Production Operations Symposium in Oklahoma City, OK, Apr. 2-4, 1995, 13 pages.

Richman and Moorman, "Physiological time-series analysis using approximate entropy and sample entropy," American Journal of Physiol. Health Circ. Physiol, Jul. 2000, vol. 278: H2039-H2049, 11 pages.

Schreiber and Schmitz, "Discrimination power of measures for nonlinearity in a time series," Physical Review E, May 1997, 55(5): 5443-5447.

Walker and Duncan, "Estimation of the Probability of an Event as a Function of Several Independent Variables," Biometrika, Jun. 1967, 54(1/2): 167-179.

Watfa, "Downhole Casing Corrosion Monitoring and Interpretation Techniques to Evaluate Corrosion in Multiple Casing Strings," SPE Production Engineering, Aug. 1991, 8 pages.

Yang et al., "Downhole leak detection: introducing a new wireline array noise tool," SPE 194264, Presented at the SPE/ICoTA Well Intervention Conference and Exhibition, The Woodlands, TX, Mar. 26-27, 2019; Society of Petroleum Engineers, 2019, 16 pages.

Yentes et al., "The Appropriate Use of Approximate Entropy and Sample Entropy with Short Data Sets," Annals of Biomedical Engineering, Feb. 2013, 41(2): 349-365.

PCT International Search Report and Written Opinion in International Appln. No. PCT/US2021/015217, dated Apr. 23, 2021, 14 pages.

Alkhalaf et al., "Machine Learning Approach to Classify Water Cut Measurements using DAS Fiber Optic Data," SPE-197349-MS, Society of Petroleum Engineers, Nov. 2019, 9 pages.

Alkhalaf et al., "Utilizing Machine Learning for a Data Driven Approach to Flow Rate Prediction," SPE-197266-MS, Society of Petroleum Engineers, Nov. 2019, XP055792195, 9 pages.

Gryzlov et al., "Novel Methods for Production Data Forecast Utilizing Machine Learning and Dynamic Mode Decomposition," SPE-202792-MS, Society of Petroleum Engineers, Nov. 2020, XP055792220, 12 pages.

Yang et al., "Intelligent Oilfield—Cloud Based Big Data Service in Upstream Oil and Gas," IPTC-19418-MS, International Petroleum Technology Conference, Mar. 2019, XP055792661, 15 pages.

PCT International Search Report and Written Opinion in International Appln. No. PCT/US2021/018380, dated May 27, 2021, 16 pages.

Al-Hajri et al., "Calculating Casing Leak Cross Flow Rate Using Surface Injection Data," SPE-188107-MS, Society of Petroleum Engineers (SPE), presented at the SPE Kingdom of Saudi Arabia Annual Technical Symposium and Exhibition, Dammam, Saudi Arabia, Apr. 24-27, 2017, 15 pages.

Al-Shehri, "Oil and Gas Wells: Enhanced Wellbore Casing Integrity Management through Corrosion Rate Prediction Using an Augmented Intelligent Approach," Sustainability, 2019, 11:818, 17 pages.

Singh et al., "Detecting Subsurface Fluid Leaks in Real-Time Using Injection and Production Rates," Advances in Water Resources 2017, 110: 147-165, 19 pages.

Tursinbayeva et al., "Improving TCO Well Integrity Process through Successful Deployment of Well Integrity Portal," SPE-189022-MS, Society of Petroleum Engineers (SPE), presented at the SPE Annual Caspian Technology Conference and Exhibition, Baku, Azerbaijan, Nov. 1-3, 2017, 14 pages.

* cited by examiner

AUTOMATED DOWNHOLE LEAK DETECTION AND PREDICTION IN WATER INJECTION WELLS

BACKGROUND

The present disclosure applies to techniques for detecting leaks in wells.

Production engineers worldwide rely on analyzing well surveillance surveys including and not limited to temperature logs, annuli pressure surveys, and injection rate trends to identify leaks. Further, the production engineers may use various diagnostic tools such as flowmeter logs to confirm a particular leak. However, this is a reactive approach. The time gap between an actual date of a leak occurrence and leak detection can be weeks or months, depending on the surveillance frequency. Delays in leak detection can result in uncontrollable and adverse leak scenarios, potentially damaging wells and other assets, and threatening the environment, including polluting fresh water aquifers. Moreover, after a leak is detected, waiting times can occur before wells are controlled and/or are fixed, for example, using rigless operation to control the well and/or workover rigs to fix the leak.

SUMMARY

The present disclosure describes techniques that can be used to automated downhole leak detection and prediction in water injection wells. In some implementations, a computer-implemented method for downhole leak detection and prediction in water injection wells includes the following. Bulk well operation information for one or more wells is accessed from a database. Real-time pressure and water rate information is received from surface and downhole gauges during operation of a water injection well. Engineered prediction-ready data is generated using the real-time pressure and water rate information by translating the bulk well operation information. Early signs of leakage at sub-surfaces of the water injection well are determined using the engineered prediction-ready data and wellbore dynamics of the water injection well. Information associated the early signs of leakage is provided based on the determining and for presentation to one or more users.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, automated downhole leaks can be predicted automatically by using prediction models. Second, Downhole Leak Detection and Prediction (DLDP) can be calibrated for specific water injection wells and fields based on subsurface environments and well histories. Third, data acquisition from well site sensors can be implemented using a consistent format. Fourth, 24×7 calculations and automatic alarms can be provided, for example, using real-time monitoring of measured values and calculated values to generate, in real time, pre-calibrated alarms for certain trends and thresholds. Fifth, computerized data analytics tools can be provided that use algorithms and artificial intelligence, allowing operators to analyze each injection cycle (for example, one-hour cycles), providing information on a regular cycle. For example, the term real-time can correspond to events that occur within a specified period of time, such as within less than a second, within a second, within minutes, or within hours. The term real-time can also refer to information that is collected for use by subsequent events that occur within a specified period of time, such as within less than a second, within a second, within minutes, or within hours after the information collection. Sixth, separate dashboards can be provided that are customized for engineers, supervisors, and managers. Seventh, instant notifications (for example, email and text) can be provided to engineers and supervisors in case leaks are detected. Eighth, escalation notifications can be provided to managers when a delay occurs for a particular engineering action. Ninth, leak prediction models can be used for individual wells and can include multiple analysis tools. Tenth, automatic report generation can occur daily, weekly, monthly, a customized time period, or as needed. Eleventh, the use of DLDP can eliminate or reduce the time taken between leak occurrence dates to leak detection date.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for Downhole Leak Detection and Prediction (DLDP) in water injection wells. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Automatic or automated DLDP techniques can be used to detect early signs of casing or tubing leakage at sub-surfaces of wells. For example, the wells can include produced water disposal (PWD) wells or sea water injection (SWI) wells that are used in the oil industry. The techniques can be implemented, for example, to use bulk data and well information stored in a well database. The techniques can also use a data feed from real-time surface and downhole gauges. Further, the techniques can automatically perform a number of calculations using an algorithm to translate the bulk data into useful engineering information in real-time. The term real-time can correspond, for example, to information that is collected for use by subsequent events that occur within a specified period of time, such as within less than a second, within a second, within minutes, or within hours after the information collection. DLDP techniques can be used for detecting and analyzing anomalies in wellbore dynamics to provide engineers and operators with early detection and prediction of downhole leakage in water injection wells. Artificial intelligence (AI) techniques can be used to notify engineers and management through email or short message service (SMS) message regarding any critical situations in the well in order to deliver timely actions. In some implementations, techniques described in the present disclosure can be iteratively defined and modified accordingly using input from subject matter experts (SMEs).

Figure 1:
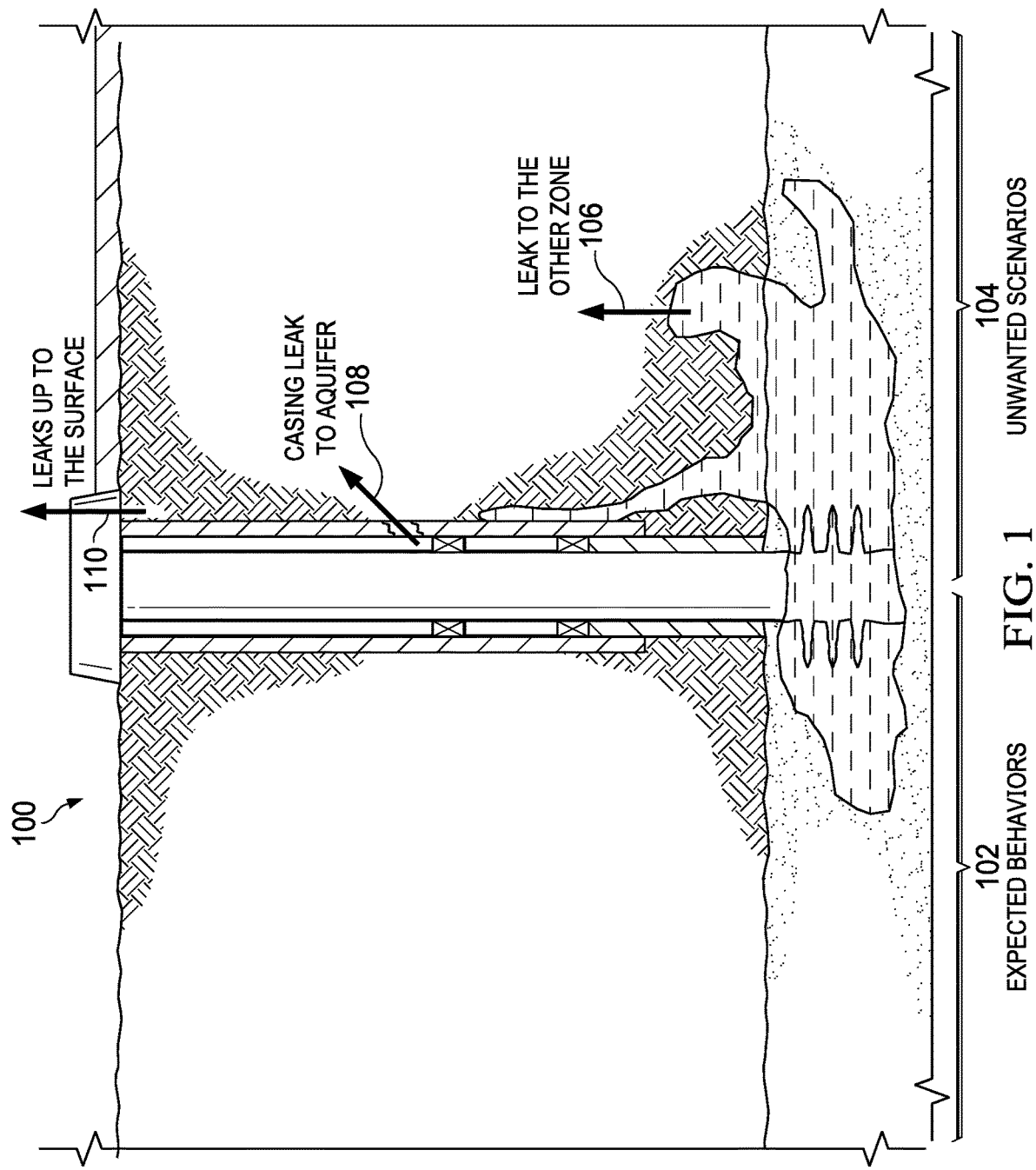
FIG. 1 is a schematic showing examples of conditions at a typical water injection well.

FIG. 1 is a schematic showing examples of conditions at a typical water injection well 100, according to some implementations of the present disclosure. The conditions can include expected behavior 102, for example, during well operations in which no leaking occurs. Unwanted behavior 104 can include, as a few examples, leaks to other zones 106, casing leaks to aquifers 108, and leaks up to the surface 110.

Techniques described in the present disclosure can be used to detect the leaks quickly within hours. Early detection of casing leakage or out-of-zone injection can be used to more quickly plan remedial measures which may save costs of expensive workover or suspending a well from injection. The techniques can be used for monitoring PWD wells' and SWI wells' integrity online. The techniques can be used to close monitoring over injection wells resulting from downhole leaks and subsequently pinpoint the cross-flow in a timely manner. Early detection of downhole leaks is desirable to take prompt action, eliminate risk, and avoid damage to property or to the environment.

Figure 2:
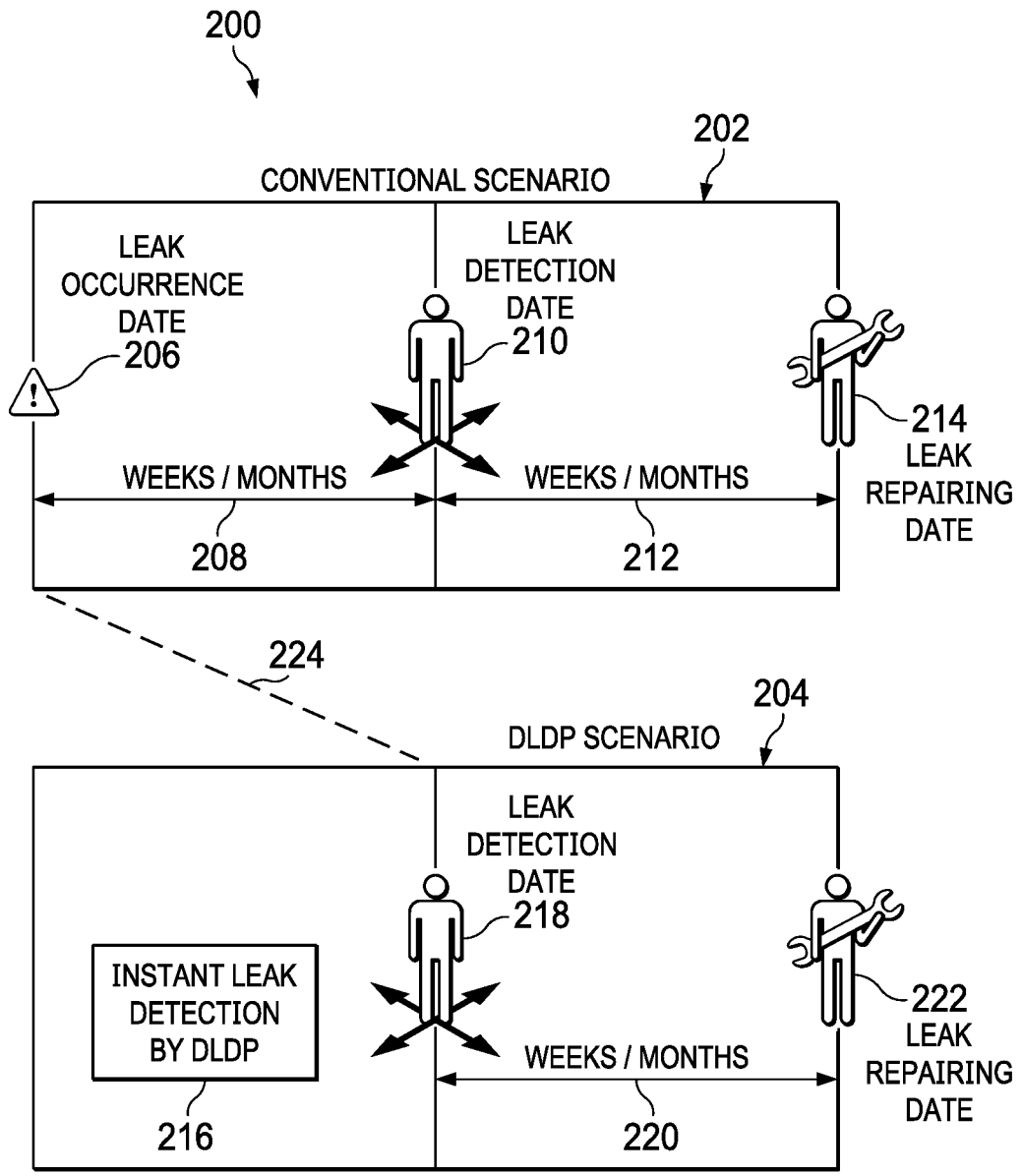
FIG. 2 is a diagram showing an example of a comparison in timelines between a conventional scenario leak detection timeline versus a Downhole Leak Detection and Prediction (DLDP) scenario leak detection timeline, according to some implementations of the present disclosure.

FIG. 2 is a diagram showing an example of a comparison 200 in timelines between a conventional scenario leak detection timeline 202 versus a DLDP scenario leak detection timeline 204, according to some implementations of the present disclosure. The timelines can apply, for example, to the typical water injection well 100.

In the conventional scenario leak detection timeline 202, after a leak occurs on a leak occurrence date 206, a leak detection latency time (for example, weeks/months 208) can occur. The leak may finally be detected on a leak detection date 210, for example, after passage of the weeks/months 208. A leak repair wait time (for example, weeks/months 212) can occur after the leak is detected but before the leak is repaired on a leak repair date 214.

In the DLDP scenario leak detection timeline 204, after the leak occurs on the leak occurrence date 206, an instant leak detection 216 (for example, detected by the DLDP) can occur. The instant detection can eliminate most or all of the leak detection latency time (for example, the weeks/months 208). As a result, the leak can be detected on a leak detection date 218, which can be shortly after the leak occurrence date 206 and days or weeks before the leak detection date 210. A leak repair wait time (for example, weeks/months 220) can include a time period that starts at the leak detection date 218 and continues until a leak repair date 222. A dashed line 224 indicates an approximate time alignment between the leak occurrence date 206 and the leak detection date 218.

Figure 3:
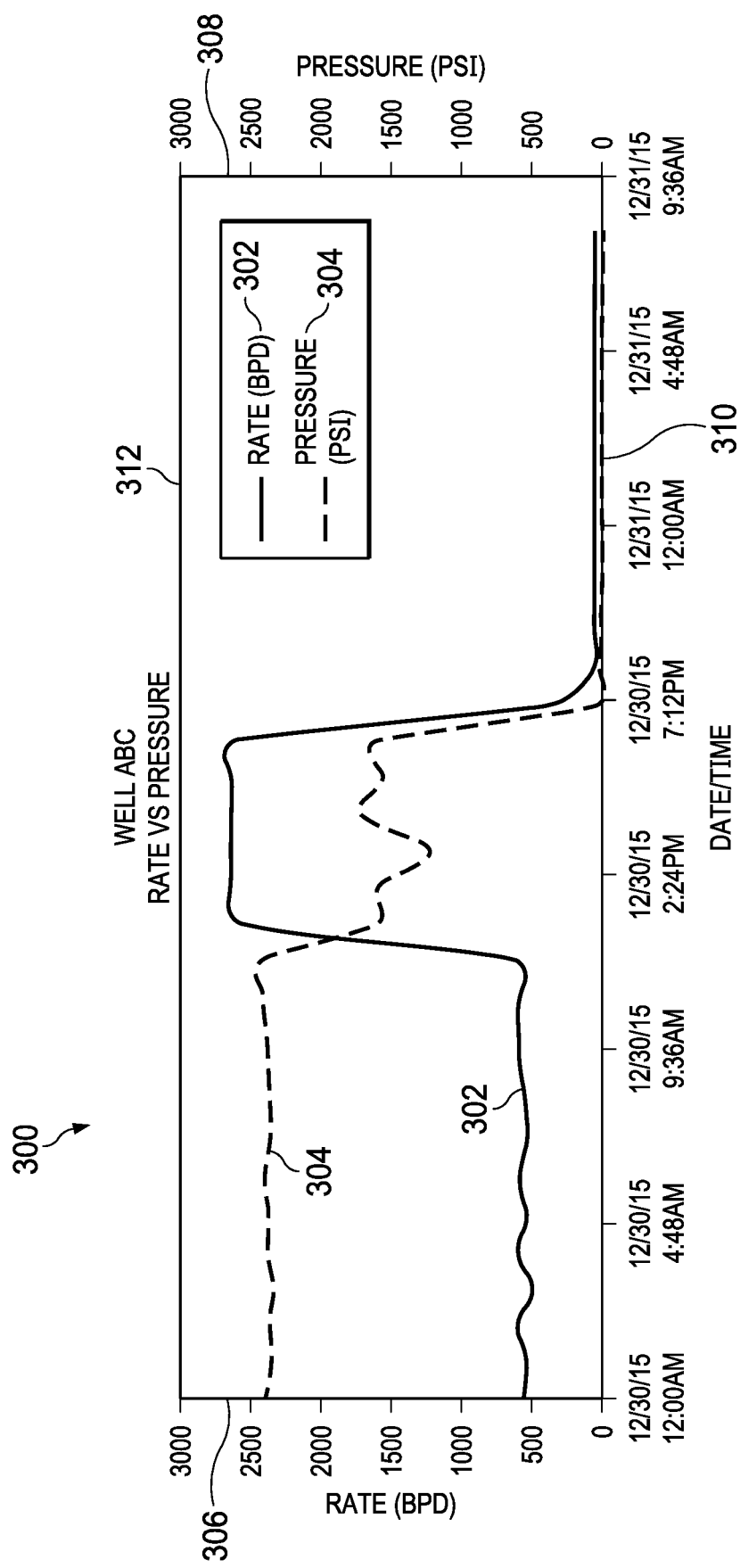
FIG. 3 is a graph showing an example of water injection rates versus a well head injection pressure plot, according to some implementations of the present disclosure.

FIG. 3 is a graph 300 showing an example of water injection rates versus a well head injection pressure plot, according to some implementations of the present disclosure. The graph 300 represents a typical plot of water injection rates 302 versus well head pressure 304. The plots are plotted relative to a rate Y-axis 306 and a pressure Y-axis 308, relative to a date/time X-axis 310. In some implementations, the graph 300 can be displayed on a DLDP dashboard. Real-time information represented in the plot can indicate an anomaly such as a downhole leakage that has just begun at a specific well (for example, Well ABC 312).

Figure 4:
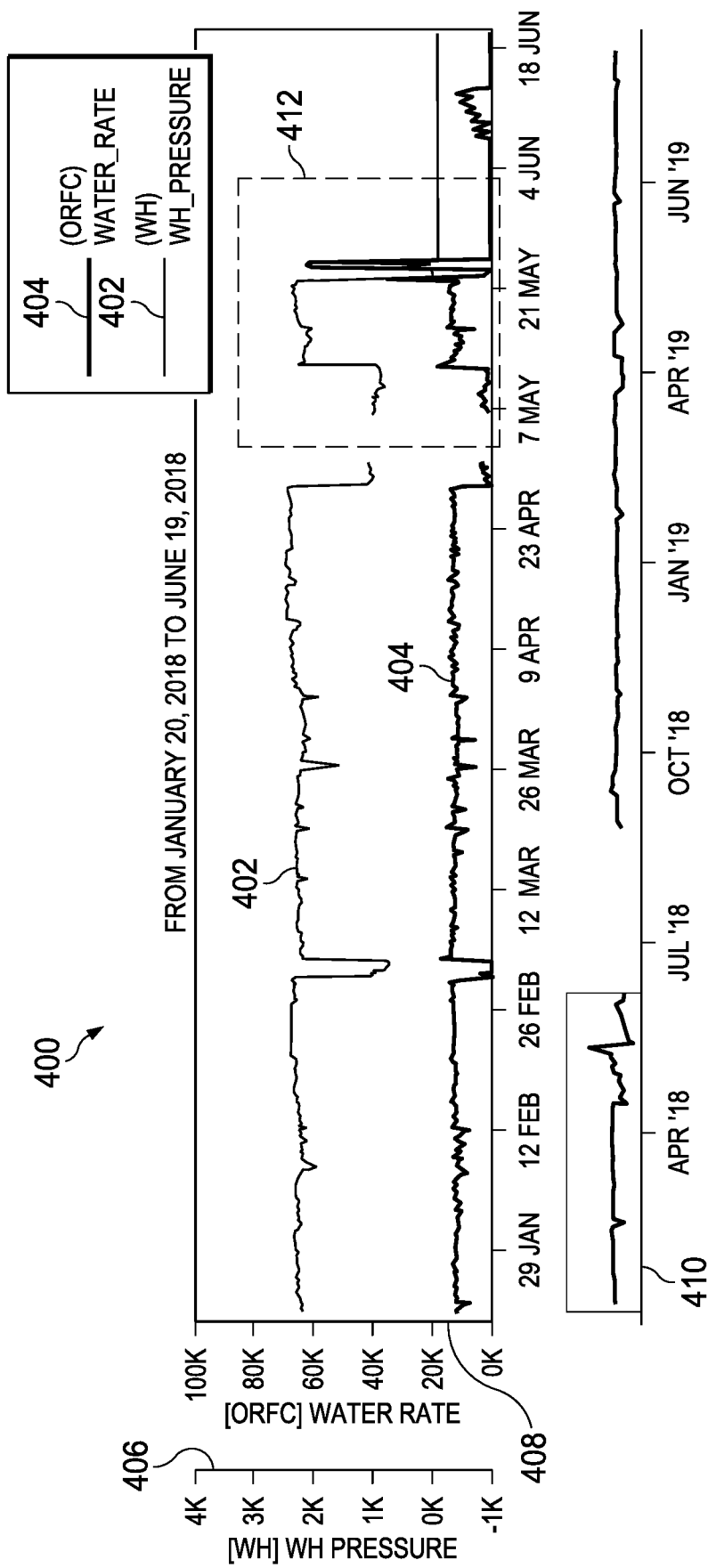
FIG. 4 is a graph showing an example of a casing leak detected from real-time data during a DLDP experiment, according to some implementations of the present disclosure.

FIG. 4 is a graph 400 showing an example of a casing leak detected from real-time data during a DLDP experiment, according to some implementations of the present disclosure. The graph 400 provides a sample case in which a leak was detected from real-time data for a specific well during a DLDP test run. The graph 400 includes a pressure plot 402 and a water rate plot 404, relative to a pressure axis 406, a water rate axis 408, and a date/time axis 410. A highlighted area 412 indicates an anomaly in which the injection wellhead pressure has dropped from 2387 pounds per square inch (psi) to zero psi and the injection rate has increased from 13.8 thousands of barrels per day (MBD) to 61 MBD.

Figure 5:
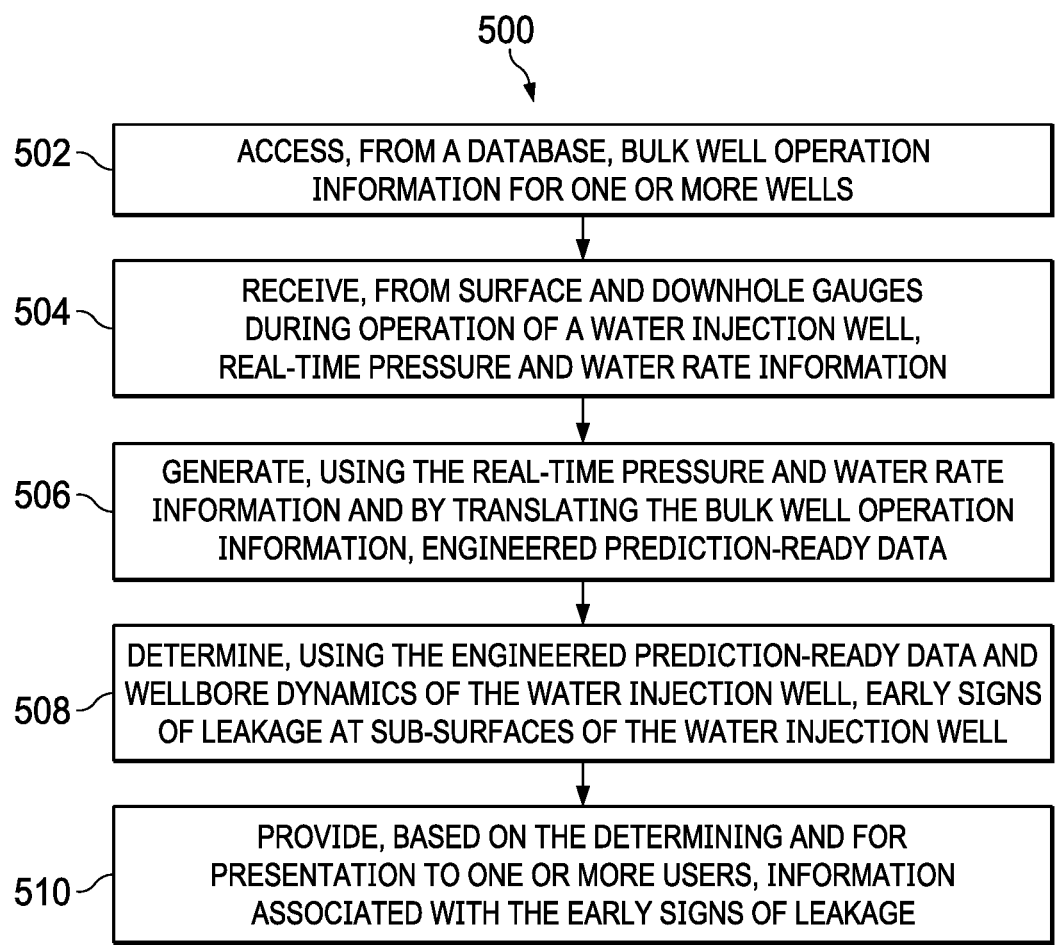
FIG. 5 is a flowchart of an example of a method for downhole leak detection and prediction in water injection wells, according to some implementations of the present disclosure.

FIG. 5 is a flowchart of an example of a method 500 for downhole leak detection and prediction in water injection wells, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, bulk well operation information for one or more wells is accessed from a database. The database can be a local database or a database that is available through a network. In some implementations, the bulk well operation information for the one or more wells can include historical information and anomaly information. For example, the historical information can include pressure, temperature, and gauge readings that are captured during operation of various wells. The bulk well operation information can also include timestamp information that can be used to correlate the historical information with anomaly information, including specific anomalies that occurred at a date and time. From 502, method 500 proceeds to 504.

At 504, real-time pressure and water rate information is received from surface and downhole gauges during operation of a water injection well. As an example, the water injection well can be a PWD well or a SWI well used in the oil industry. The real-time information can come from sensors that transmit readings in real time. From 504, method 500 proceeds to 506.

At 506, engineered prediction-ready data is generated using the real-time pressure and water rate information by translating the bulk well operation information. For example, the information can be placed in a format that allows efficient generation of predictions that are based on the information. From 506, method 500 proceeds to 508.

At 508, early signs of leakage at sub-surfaces of the water injection well are determined using the engineered prediction-ready data and wellbore dynamics of the water injection well. For example, the early signs of leakage can include leaks associated with casing leaking and tubing leakage. Determining the early signs of leakage at the sub-surfaces of the water injection well can include detecting the early signs of leakage by correlating the real-time pressure and water rate information of the water injection well to historical patterns of operations and anomalies of the one or more wells. For example, timestamps of anomalies can be compared to timestamps of historical production information. This can be repeated across many wells in order to detect patterns that can be used to predict anomalies in other wells based on current conditions.

In some implementations, correlating the real-time pressure and water rate information of the water injection well to the historical patterns of operations and anomalies of the one or more wells can include correlations focused on wells having similar geology and operating conditions. For example, the geology similarities can include similar rock formations, geographical regions, and similarities to other wells in a same area.

In some implementations, correlating can include the use of artificial intelligence (AI) techniques. For example, the AI techniques can include artificial neural networks, fuzzy models, genetic algorithms, and rule-based systems. In some implementations, the AI techniques can be iteratively trained using input from SMEs. For example, the SMEs can review the predictions made from combinations of historical information and anomalies, and the SMEs can update models as needed to reflect what the SMEs know to be correct information. From 508, method 500 proceeds to 510.

At 510, information associated the early signs of leakage is provided based on the determining and for presentation to one or more users. For example, providing the information for presentation to one or more users can include providing the information for presentation in a dashboard of a user interface and providing notifications deliverable to the one or more users using one or more of email and SMS messages. Dashboards can include UIs, for example, that are described with reference to FIGS. 3-4. In some implementations, based on information that is displayed in a dashboard, a user can select a suggested action (for example, pause drilling operations or schedule maintenance) that is automatically implemented upon selection by the user. After 510, method 500 can stop.

Figure 6:
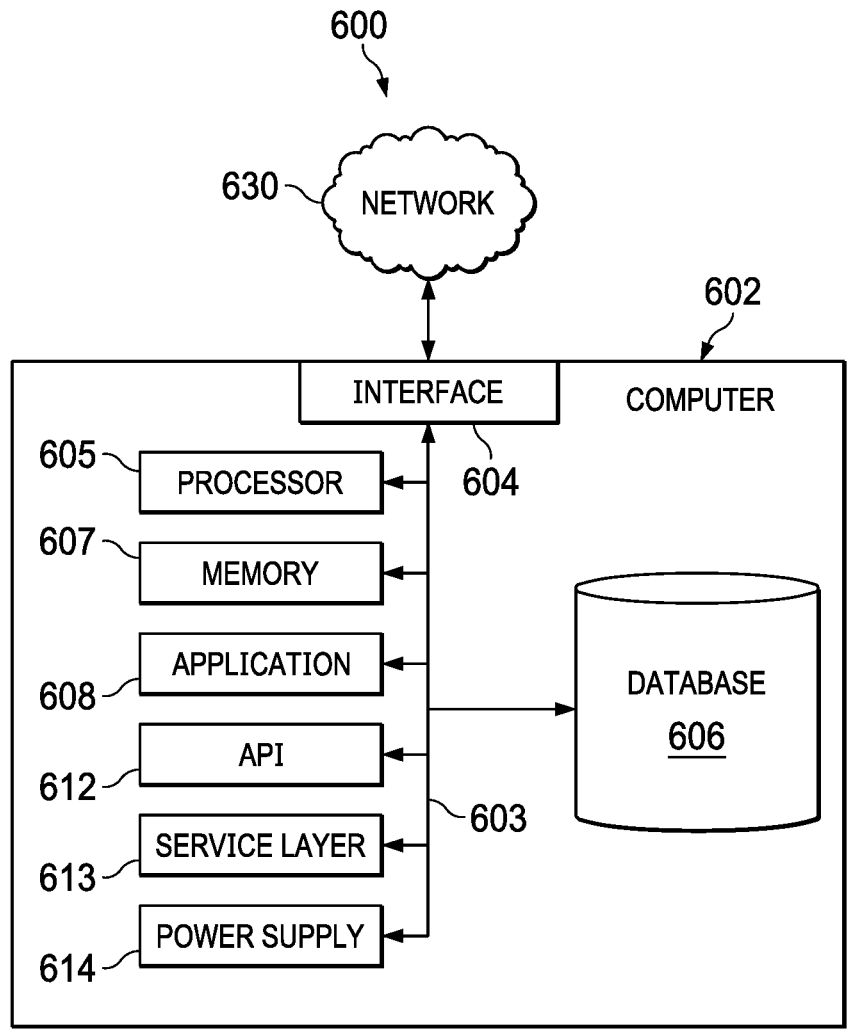
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. Bulk well operation information for one or more wells is accessed from a database. Real-time pressure and water rate information is received from surface and downhole gauges during operation of a water injection well. Engineered prediction-ready data is generated using the real-time pressure and water rate information by translating the bulk well operation information. Early signs of leakage at sub-surfaces of the water injection well are determined using the engineered prediction-ready data and wellbore dynamics of the water injection well. Information associated the early signs of leakage is provided based on the determining and for presentation to one or more users.

The foregoing and other described implementations can each, optionally, include one or more of the following features:

A first feature, combinable with any of the following features, where the bulk well operation information for the one or more wells includes historical information and anomaly information.

A second feature, combinable with any of the previous or following features, where the early signs of leakage are associated with casing leaking and tubing leakage.

A third feature, combinable with any of the previous or following features, where the water injection well is a produced water disposal (PWD) well or a sea water injection (SWI) well used in the oil industry.

A fourth feature, combinable with any of the previous or following features, where determining the early signs of leakage at the sub-surfaces of the water injection well includes detecting the early signs of leakage by correlating the real-time pressure and water rate information of the water injection well to historical patterns of operations and anomalies of the one or more wells.

A fifth feature, combinable with any of the previous or following features, where correlating the real-time pressure and water rate information of the water injection well to the historical patterns of operations and anomalies of the one or more wells includes correlations focused on wells having similar geology and operating conditions.

A sixth feature, combinable with any of the previous or following features, where correlating includes using artificial intelligence (AI) techniques.

A seventh feature, combinable with any of the previous or following features, where the AI techniques are iteratively trained using input from subject matter experts (SMEs).

An eighth feature, combinable with any of the previous or following features, where where providing the information for presentation to one or more users includes providing the information for presentation in a dashboard of a user interface and providing notifications deliverable to the one or more users using one or more of email and short message service (SMS) messages.

In a second implementation, a non-transitory, computer-readable medium storing one or more instructions executable by a computer system to perform operations including the following. Bulk well operation information for one or more wells is accessed from a database. Real-time pressure and water rate information is received from surface and downhole gauges during operation of a water injection well. Engineered prediction-ready data is generated using the real-time pressure and water rate information by translating the bulk well operation information. Early signs of leakage at sub-surfaces of the water injection well are determined using the engineered prediction-ready data and wellbore dynamics of the water injection well. Information associated the early signs of leakage is provided based on the determining and for presentation to one or more users.

The foregoing and other described implementations can each, optionally, include one or more of the following features:

A first feature, combinable with any of the following features, where the bulk well operation information for the one or more wells includes historical information and anomaly information.

A second feature, combinable with any of the previous or following features, where the early signs of leakage are associated with casing leaking and tubing leakage.

A third feature, combinable with any of the previous or following features, where the water injection well is a produced water disposal (PWD) well or a sea water injection (SWI) well used in the oil industry.

A fourth feature, combinable with any of the previous or following features, where determining the early signs of leakage at the sub-surfaces of the water injection well includes detecting the early signs of leakage by correlating the real-time pressure and water rate information of the water injection well to historical patterns of operations and anomalies of the one or more wells.

A fifth feature, combinable with any of the previous or following features, where correlating the real-time pressure and water rate information of the water injection well to the historical patterns of operations and anomalies of the one or more wells includes correlations focused on wells having similar geology and operating conditions.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. Bulk well operation information for one or more wells is accessed from a database. Real-time pressure and water rate information is received from surface and downhole gauges during operation of a water injection well. Engineered prediction-ready data is generated using the real-time pressure and water rate information by translating the bulk well operation information. Early signs of leakage at sub-surfaces of the water injection well are determined using the engineered prediction-ready data and wellbore dynamics of the water injection well. Information associated the early signs of leakage is provided based on the determining and for presentation to one or more users.

The foregoing and other described implementations can each, optionally, include one or more of the following features:

A first feature, combinable with any of the following features, where the bulk well operation information for the one or more wells includes historical information and anomaly information.

A second feature, combinable with any of the previous or following features, where the early signs of leakage are associated with casing leaking and tubing leakage.

A third feature, combinable with any of the previous or following features, where the water injection well is a produced water disposal (PWD) well or a sea water injection (SWI) well used in the oil industry.

A fourth feature, combinable with any of the previous or following features, where determining the early signs of leakage at the sub-surfaces of the water injection well includes detecting the early signs of leakage by correlating the real-time pressure and water rate information of the water injection well to historical patterns of operations and anomalies of the one or more wells.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method for downhole leak detection and prediction in water injection wells, comprising:
    accessing, from a database, bulk well operation information for one or more water injection wells;
    generating, by translating the bulk well operation information, engineered prediction-ready data in a format that allows efficient generation of predictions of downhole leaks in a water injection well different from the one or more water injection wells;
    receiving, from surface and downhole gauges during operation of the water injection well, wellbore dynamics information of the water injection well, including real-time pressure data and water rate information for the water injection well, wherein the wellbore dynamics information is in the format of the engineered prediction-ready data;
    determining, using a downhole leak detection prediction (DLDP) model, the engineered prediction-ready data, and the wellbore dynamics information of the water injection well, early signs of leakage at sub-surfaces of the water injection well, wherein determining the early signs of leakage at the sub-surfaces of the water injection well includes correlating the real-time pressure data and water rate information of the water injection well to historical patterns of operations and anomalies; and
    providing, based on the determining and for presentation to one or more users, information associated with the early signs of leakage.

2. The computer-implemented method of claim 1, wherein the bulk well operation information for the one or more water injection wells includes historical information and anomaly information.

3. The computer-implemented method of claim 1, wherein the early signs of leakage are associated with casing leaking and tubing leakage.

4. The computer-implemented method of claim 1, wherein the water injection well is a produced water disposal (PWD) well or a sea water injection (SWI) well used in the oil industry.

5. The computer-implemented method of claim 1, wherein correlating the real-time pressure data and water rate information of the water injection well to the historical patterns of operations and anomalies of the one or more water injection wells includes correlations focused on wells having similar geology and operating conditions.

6. The computer-implemented method of claim 5, wherein correlating includes using artificial intelligence (AI) techniques.

7. The computer-implemented method of claim 6, wherein the AI techniques are iteratively trained using input from subject matter experts (SMEs).

8. The computer-implemented method of claim 1, wherein providing the information for presentation to one or more users includes providing the information for presentation in a dashboard of a user interface and providing notifications deliverable to the one or more users using one or more of email and short message service (SMS) messages.

9. A non-transitory, computer-readable medium storing one or more instructions executable by a computer system to perform operations comprising:
   accessing, from a database, bulk well operation information for one or more water injection wells;
   generating, by translating the bulk well operation information, engineered prediction-ready data in a format that allows efficient generation of predictions of downhole leaks in a water injection well different from the one or more water injection wells;
   receiving, from surface and downhole gauges during operation of the water injection well, wellbore dynamics information of the water injection well, including real-time pressure data and water rate information for the water injection well, wherein the wellbore dynamics information is in the format of the engineered prediction-ready data;
   determining, using a downhole leak detection prediction (DLDP) model, the engineered prediction-ready data, and the wellbore dynamics information of the water injection well, early signs of leakage at sub-surfaces of the water injection well, wherein determining the early signs of leakage at the sub-surfaces of the water injection well includes correlating the real-time pressure data and water rate information of the water injection well to historical patterns of operations and anomalies; and
   providing, based on the determining and for presentation to one or more users, information associated with the early signs of leakage.

10. The non-transitory, computer-readable medium of claim 9, wherein the bulk well operation information for the one or more water injection wells includes historical information and anomaly information.

11. The non-transitory, computer-readable medium of claim 9, wherein the early signs of leakage are associated with casing leaking and tubing leakage.

12. The non-transitory, computer-readable medium of claim 9, wherein the water injection well is a produced water disposal (PWD) well or a sea water injection (SWI) well used in the oil industry.

13. The non-transitory, computer-readable medium of claim 9, wherein correlating the real-time pressure data and water rate information of the water injection well to the historical patterns of operations and anomalies of the one or more water injection wells includes correlations focused on wells having similar geology and operating conditions.

14. A computer-implemented system, comprising:
   one or more processors; and
   a non-transitory computer-readable storage medium coupled to the one or more processors and storing programming instructions for execution by the one or more processors, the programming instructions instructing the one or more processors to perform operations comprising:
      accessing, from a database, bulk well operation information for one or more water injection wells;
      generating, by translating the bulk well operation information, engineered prediction-ready data in a format that allows efficient generation of predictions of downhole leaks in a water injection well different from the one or more water injection wells;
      receiving, from surface and downhole gauges during operation of the water injection well, wellbore dynamics information of the water injection well, including real-time pressure data and water rate information for the water injection well, wherein the wellbore dynamics information is in the format of the engineered prediction-ready data;
      determining, using a downhole leak detection prediction (DLDP) model, the engineered prediction-ready data, and the wellbore dynamics information of the water injection well, early signs of leakage at sub-surfaces of the water injection well, wherein determining the early signs of leakage at the sub-surfaces of the water injection well includes correlating the real-time pressure data and water rate information of the water injection well to historical patterns of operations and anomalies; and
      providing, based on the determining and for presentation to one or more users, information associated with the early signs of leakage.

15. The computer-implemented system of claim 14, wherein the bulk well operation information for the one or more water injection wells includes historical information and anomaly information.

16. The computer-implemented system of claim 14, wherein the early signs of leakage are associated with casing leaking and tubing leakage.

17. The computer-implemented system of claim 14, wherein the water injection well is a produced water disposal (PWD) well or a sea water injection (SWI) well used in the oil industry.

* * * * *